April 9, 1935.  R. E. BRANDELL  1,996,898
METHOD AND MEANS FOR DRAINING POTTED PLANTS
Filed June 9, 1934
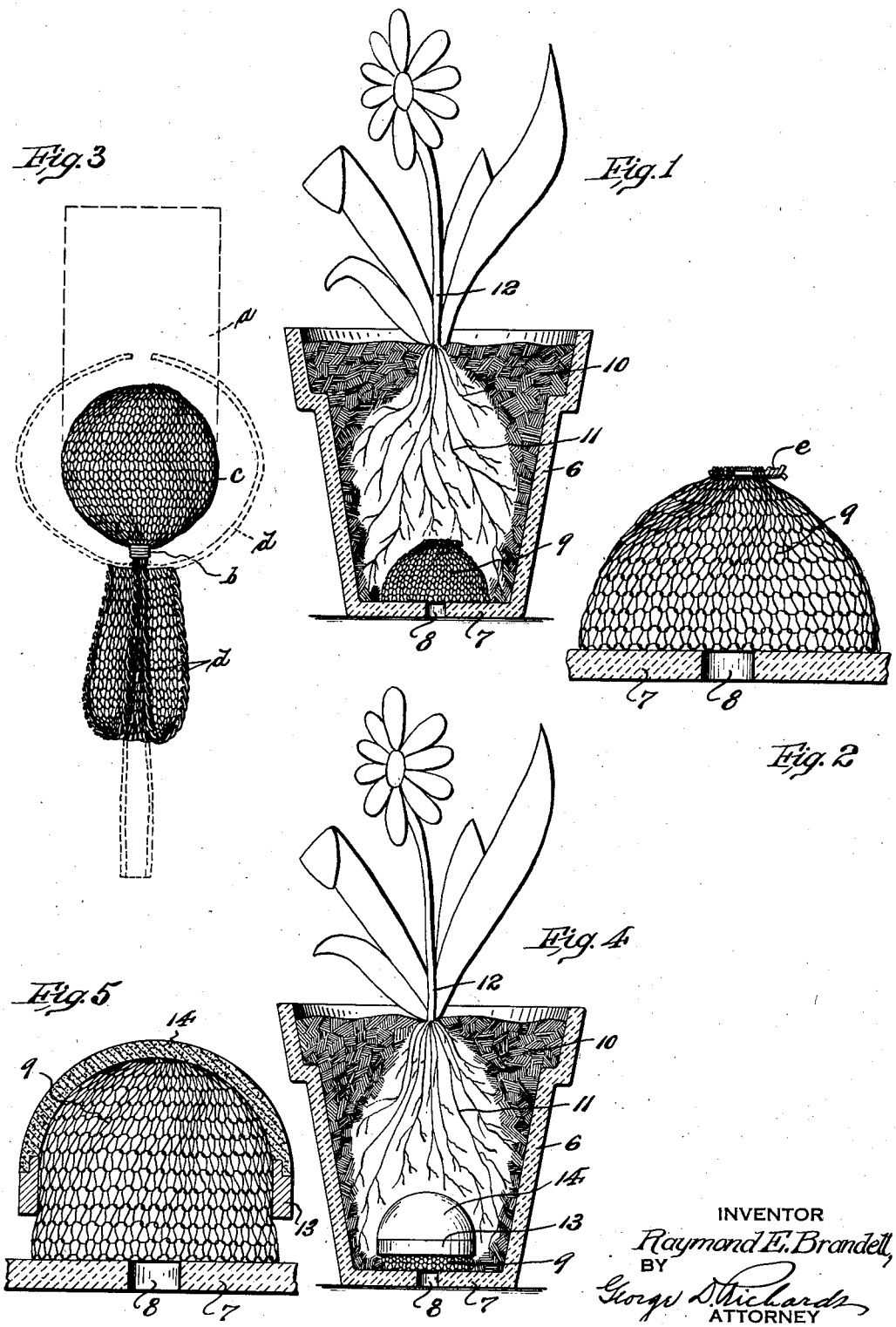
INVENTOR
Raymond E. Brandell,
BY
George D. Richards
ATTORNEY Patented Apr. 9, 1935

1,996,898

UNITED STATES PATENT OFFICE 1,996,898

METHOD AND MEANS FOR DRAINING POTTED PLANTS

Raymond E. Brandell, Chicago, Ill., assignor to Metal Textile Corporation, West Orange, N. J., a corporation of Delaware Application June 9, 1934, Serial No. 729,892

9 Claims. (Cl. 47—38)

This invention relates to novel method and means for draining flower pots, flower boxes and other soil receptacles for growing plants.

The rearing of plants in flower pots, flower boxes and similar soil receptacles and containers has heretofore not infrequently failed of attaining healthy development and growth of the plants, and the plants have either eventually died or at best have shown but poor and sickly life. The failure of plants to thrive in such cases is most commonly due to the fact that the soil in the pot, box or other container in which the plants are rooted has not been properly drained, with the result, that accumulated moisture turns the soil sour so that the roots of the plant rot, and the plant becomes sickly and often quickly dies. Ordinarily the pot, box or other soil container is provided in its bottom with a drainage opening or openings, but such openings, when unprotected, become choked by the spreading plant roots so that the drainage of excess moisture therethrough is impeded and eventually stopped. Even where some attempt is made to cover the drainage openings by shields of various kinds, calculated to avoid direct entrance of the plant roots into the openings, the roots will nevertheless work their way around the shield and into the drainage openings so as to eventually stop up the same.

It is the object of this invention to provide a novel method and means of protecting the drainage openings of soil containers for growing plants against obstruction by the plant roots, so as to assure at all times unimpeded draining of excess moisture from the soil through the openings. To this end, the invention comprises the interposition between the drainage opening or openings and the soil within the container of a metallic spongiform and highly porous or interstitial body which is impervious to choking penetration by plant roots, while yet being readily pervious to the percolation of moisture therethrough and thence through the drainage opening or openings of the soil container.

The invention has for a somewhat more specific object to provide a novel form drainage opening protective device, for commercial distribution as a horticultural accessory, having in combination therewith means to enrich and sweeten the soil in a container with which the device is used.

Other objects of this invention, not at this time more particularly enumerated, will be understood from the following detailed description of the same.

Illustrative embodiments of the invention are shown in the accompanying drawing, in which:

Fig. 1 is a vertical longitudinal section of a potted plant, showing the application of the novel protective device to the drainage opening of the pot; Fig. 2 is a fragmentary sectional view of a flower pot bottom and its drainage open, drawn on an enlarged scale, and showing, in operative relation to said drainage opening, the novel metallic interstitial or spongiform protective devices; and Fig. 3 is a schematic view, illustrating one form of the metallic spongiform protective device, and the method of producing the same.

Fig. 4 is a sectional view similar to that of Fig. 1, but showing a modified construction of the pot drainage opening protective device as devised to further function as a soil improver; and Fig. 5 is in part a side elevation and in part a sectional view of the modified protective device, drawn on an enlarged scale.

Similar characters of reference are employed in the above described views, to indicate corresponding parts.

In the said drawing, the reference character 6 indicates a flower pot having in its bottom 7 the customary drainage opening 8. The reference character 9 indicates one form of the novel drainage opening protective device, the same comprising a ball-like mass or wad of metallic material calculated to provide a highly porous or interstitial body of sponge-like form. Preferably the protective device is fabricated from a comparatively non-corrosive metal such as copper, bronze, aluminum, zinc or the like. Such metallic material may be wrought into the desired porous or interstitial mass or body in any suitable manner. To illustrate, one very satisfactory method of manufacturing the device is shown in Fig. 3, and comprises, first, knitting a strand of the selected metallic material into a tubular sleeve $a$, and then constricting this sleeve intermediate its ends in any suitable manner, as by a tie $b$, or merely by twisting the same, thereby providing oppositely extending end sections. One of said end sections is crumpled or balled up into a spheriodal mass to form a spongiform center body or cover $c$. The remaining end section is then turned back over and around said center body or core $c$ to provide an enveloping cover section $d$, the free end of which is gathered together and secured by suitable fastening means $e$. The structure thus produced provides the highly porous or interstitial body 9, which is roughly of ball-like form and somewhat resilient in character.

Before placing the soil 10 in the pot 6, the protective device 9 is placed within the latter so as to be disposed over the drainage opening 8. After the device 9 is deposited within the latter, and the roots 11 of the plant 12 are buried in the soil, the weight of the soil will cause the bottom portion of the device 9 to flatten and spread over a considerable area of the pot bottom 7 surrounding the drainage opening. Owing to the labyrinthine interstitial character of the mass of the device 9, it will be impossible for the plant roots 11 to penetrate the device sufficiently to choke the same, and consequently the excess of water which is administered to the soil will percolate therethrough, and will easily find its way through the interstices of the device so as to easily reach and be discharged through the drainage opening 8. As a consequence of this, the soil will remain sweet and conditioned to best support the healthy growth of the potted plant.

While I have described the application of the device 9 to the ordinary flower pot as a protection against the clogging or choking of its drainage opening, it will be obvious that the device 9 is likewise applicable to the drainage opening or openings of any other form of soil receptacle in which plants are to be grown, such e. g. as window-boxes, transportation boxes or trays, and the like.

Referring to Figs. 4 and 5 of the drawing, there is shown therein a modified form of the drainage opening protective device, which is constructed to provide the additional function of improving the soil within the container wherein the device is used. This form of the device comprises the interstitial spongiform body 9 of fabricated metallic material. Around the body 9, intermediate its top and bottom portions, is engaged an annular retainer ring or band 13 made of any suitable material. Molded upon the upper portion of said retaining ring or band 13 is a distintegratable material 14 preferably of hollow semi-spherical form, whereby the same envelops the upper side or hemisphere of the body 9. This disintegratable material may comprise a suitable combination of ingredients which, when deposited in the soil 10, and subjected to the disintegrating effects of the water administered to the latter, will enter the soil to enrich and sweeten the same to the end that better plant growth is sustained thereby. Illustrative of one combination of materials making up the disintegratable body 14, is the following, viz a composition composed of charcoal, lime, and iron shavings or filings bound together in an initial mass by animal glue or other suitable binder. Compositions of other formulæ may be employed according to the particular character of soil treatment desired to be effected.

The novel modified form of the drainage protective device having the soil treatment means incorporated therewith, may be readily handled in commercial distribution as a horticultural accessory. When the same is deposited in a soil receptacle, in operative relation to the drainage opening of the latter, the water administered to the soil will contact with the disintegratable body, and will flow around the same to eventually percolate through the lower exposed portion of the interstitial body 9, through which the excess water will pass for discharge through the drainage opening. Eventually the body 14 will disintegrate and the ingredients thereof will work into the soil thereby to treat the same in the way desired, eventually uncovering the device 9 to full exposure to the seepage of water.

It will be obvious that this invention is capable of embodiment in various forms, and the drainage device per se is capable of being made in various ways, and since many changes could be made in the above described constructions and many apparently widely different embodiments of this invention could be made without departing from the scope thereof as defined by the herefollowing claims, it is intended that all matter contained in the above description or shown in the accompanying drawing shall be interpreted as illustrative and not in a limiting sense.

I claim:

1. Means to protect the drainage openings of soil receptacles for growing plants, comprising an interstitial spongiform mass of metallic material for interposition between the drainage opening and contained soil of the receptacle.

2. Means to protect the drainage openings of soil receptacles for growing plants, comprising a body formed of knitted metallic material balled into an interstitial mass for interposition between the drainage opening and contained soil of the receptacle.

3. Means to protect the drainage of soil receptacles for growing plants, comprising a body formed of a sleeve of knitted metallic material having one end balled into a core and the other end turned over and around said core and secured to provide a cover enveloping said core, the body thus formed providing a more or less resilient and labyrinthic interstitial mass for interposition between the drainage opening and contained soil of the receptacle.

4. Combined means for protecting the drainage openings and treating the soil of soil receptacles for growing plants, comprising an interstitial spongiform mass of metallic material, and a molded body of disintegratable soil treating composition encasing a portion of said spongiform mass.

5. Combined means for protecting the drainage openings and treating the soil of soil receptacles for growing plants, comprising a body formed of knitted metallic material balled into an interstitial mass, a retaining ring girdling said mass, and a molded body of disintegratable soil treating composition supported by said ring and encasing the upper portion of said interstitial mass.

6. Combined means for protecting the drainage openings and treating the soil of soil receptacles for growing plants, comprising an interstitial mass of metallic material, a retaining ring girdling said mass, and a molded body of disintegratable soil treating composition supported by said ring exteriorly of said interstitial mass.

7. Combined means for protecting the drainage openings and treating the soil of soil receptacles for growing plants, comprising a body formed of a sleeve of knitted metallic material having one end balled into a core and the other end turned over and around said core and secured to provide a cover enveloping said core, the body thus formed providing a more or less labyrinthic interstitial mass, and a molded body of disintegratable soil treating composition exteriorly disposed upon a portion of said body.

8. Combined means for protecting the drainage openings and treating the soil of soil receptacles for growing plants, comprising a body formed of a sleeve of knitted metallic material having one end balled into a core and the other end turned over and around said core and secured to provide a cover enveloping said core, the body thus formed providing a more or less labyrinthic interstitial mass, a retaining ring girdling said mass, and a molded body of disintegratable soil treating composition supported by said ring and encasing the upper portion of said mass.

9. The method of protecting the drainage openings of soil receptacles for growing plants against clogging, comprising interposing a labyrinthic interstitial mass of metallic material between the drainage opening and soil content of the receptacle.

RAYMOND E. BRANDELL.